June 9, 1936.  A. G. F. WALLGREN  2,043,272
BEARING
Filed Oct. 24, 1932
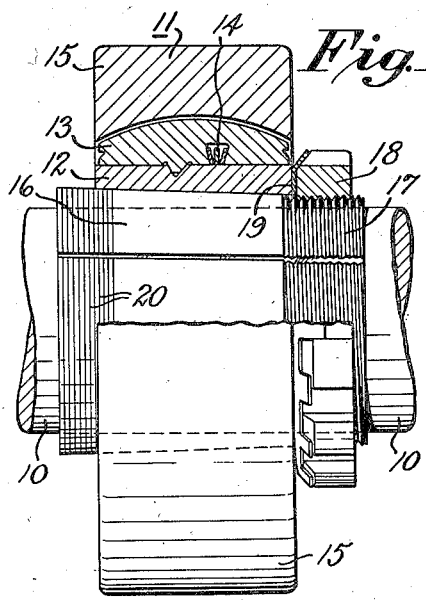
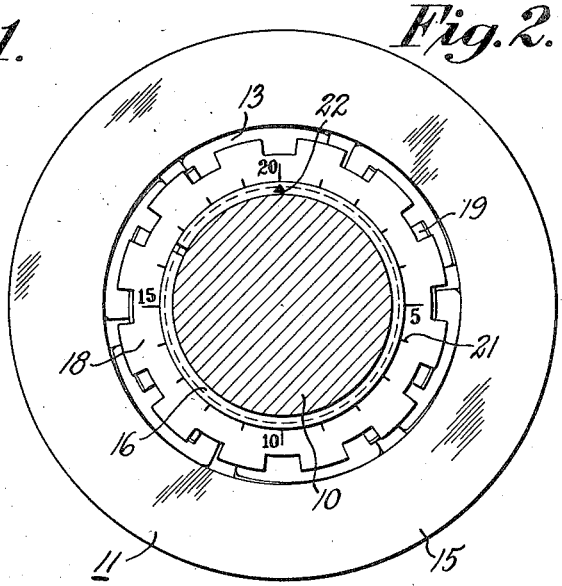
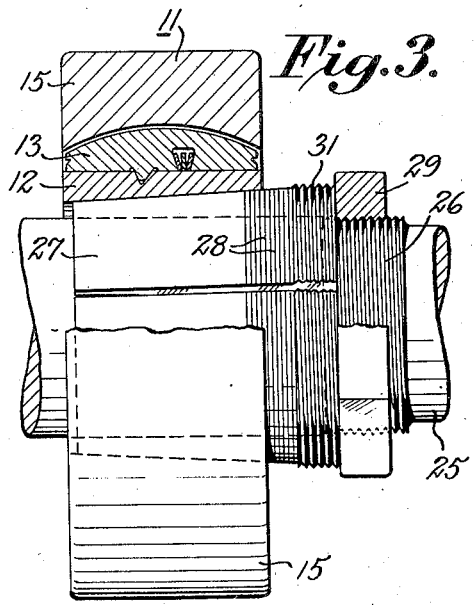
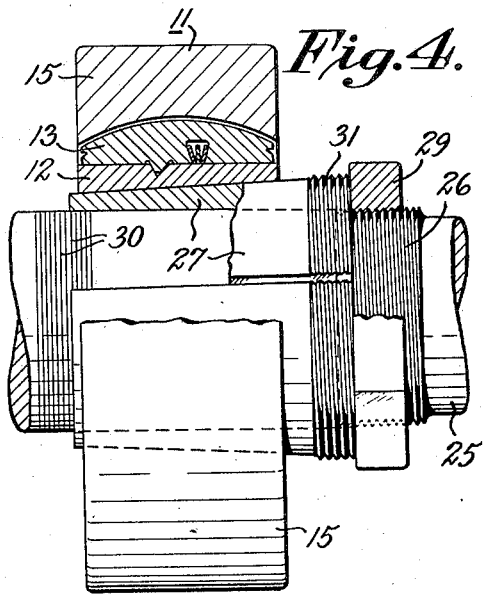
INVENTOR
August Gunnar Ferdinand Wallgren
BY
Wm T. Hedlund
his ATTORNEY Patented June 9, 1936

2,043,272

UNITED STATES PATENT OFFICE 2,043,272

BEARING

August Gunnar Ferdinand Wallgren, Stockholm, Sweden, assignor to Aktiebolaget Nomy, Stockholm, Sweden, a corporation of Sweden Application October 24, 1932, Serial No. 639,162
In Sweden October 31, 1931

12 Claims. (Cl. 308—71)

My invention relates to bearings and more particularly to devices for securing bearing rings to shafts or the like.

One means by which a bearing may be secured to the shaft is by providing the bearing ring associated with the shaft (usually the inner bearing ring) with a conical bore and by forcing a split sleeve having a cylindrical bore and a conical outer surface between the shaft and the conical bore of the bearing ring. With this type of bearing device, in order for satisfactory results to be obtained, it is necessary to force the split sleeve between the ring and the shaft just the correct distance. If the sleeve is not forced in far enough the bearing may become loose on the shaft during operation, while if the sleeve is forced in too far it exerts too great a force against the bearing ring and may expand it sufficiently to unduly reduce the necessary looseness or clearance and perhaps cause the bearing to bind.

The object of my invention is to avoid setting the parts too tightly or too loosely and in carrying out the invention I provide a scale by means of which may be determined the correct distance that the sleeve should be forced between the bearing ring and the shaft. In other words, once having determined the correct setting of the parts, I provide means whereby this setting can be duplicated in all bearings.

Further objects and advantages of my invention will be apparent from the following description considered in connection with the accompanying drawing which forms a part of this specification, and of which:

Fig. 1 is a side view, partially in cross-section, of a preferred embodiment of my invention;

Fig. 2 is an end view of a bearing embodying another form of my invention;

Fig. 3 is a view, partially in cross-section, showing a third embodiment of my invention, and Fig. 4 is a view, partially in cross-section, of still another embodiment of my invention.

Referring more particularly to Fig. 1, reference character 10 designates a cylindrical shaft carrying the bearing 11. Although I have developed the invention particularly for bearings of the tilting block type as shown more fully in my Patent No. 1,871,485, the invention is not limited to such bearings.

Bearing 11 comprises an inner bearing ring 12 having a conical bore and a generally cylindrical outer surface. Arranged around the cylindrical surface of the ring 12 is a plurality of bearing blocks or load transmitting elements 13 having cylindrical inner surfaces and spherical or substantially spherical outer surfaces. These blocks are restricted in movement by retaining rings 14. Around the outer spherical surfaces of blocks 13 is an outer bearing ring 15 having an inner spherical sliding surface against which the blocks bear. The outer ring 15 is supported in any suitable manner.

Between the inner ring 12 and the shaft 10 there is located the split clamping sleeve 16. The clamping sleeve is formed with a cylindrical bore and a conical outer surface, the taper of which is substantially the same as that of the conical bore of ring 12. The cylindrical bore of sleeve 16 is of substantially the same diameter as shaft 10. The smaller end of sleeve 16 is formed with screw threads 17. A nut 18 is adapted to be screwed on to the sleeve 16 and to bear against a lock washer 19 which in turn bears against one end of ring 12.

When the bearing is to be secured to the shaft the sleeve 16 is placed on the shaft at the desired point and the bearing is slipped thereon toward the left, as viewed in Fig. 1. The lock washer 19 is put in place and the nut 18 screwed on to the threaded end of sleeve 16. The nut is tightened until it has forced ring 12 onto the conical sleeve just far enough so that the ring cannot be rotated relative to the sleeve, nor the sleeve relative to the shaft without the exertion of an appreciable force. The mechanic then notes the position of the end of ring 12 with respect to the scale 20 formed on the larger end of the sleeve and then proceeds to tighten nut 18 by wrench or other force member until the ring has moved relative to the sleeve a certain number of scale lines. For convenience, the scale lines are preferably so spaced that the ring should be moved the distance between two of the lines. When the nut is tightened this amount, it has forced the ring on to the conical sleeve sufficiently so that the clamping effect is great enough to securely hold the bearing in place on the shaft while at the same time it is not great enough to expand ring 12 and produce too little looseness between the blocks 13 and the ring 15. When the nut has been thus properly adjusted, one of the wings on the lock washer may be bent down into an aligned slot in nut 18 to lock the nut in place in known manner.

It will be noted that when the ring 12 is forced onto sleeve 16 it will cause the sleeve to contract and grip the shaft while at the same time the ring 12 will be forced tightly onto the conical sleeve.

The device shown in Fig. 2 is similar to that shown in Fig. 1 with the exception that the scale, instead of comprising parallel lines on the sleeve 16 consists of a circularly arranged mark 21 located on the end of nut 18. A reference point 22 is preferably marked on the threaded end of sleeve 16. Thus by means of the scale 21, the number of turns, or fraction of a turn, through which nut 18 should be rotated in order to effect the desired clamping effect may be measured.

In the device shown in Fig. 3 the shaft is designated by reference character 25 and is provided with a threaded portion 26. The bearing 11 shown in this figure is similar to the bearing illustrated in Fig. 1, with the exception that the taper of the conical bore of bearing ring 12 is in an opposite direction. A split clamping ring 27 is located between the shaft 25 and the ring 12. The larger end of the clamping sleeve is provided with parallel lines forming a scale 28. A nut 29 is adapted to be screwed on the threads 26 of the shaft and to force sleeve 27 into the conical bore of ring 12. During the tightening operation some form of abutment should be held against the left hand end of ring 12 in order to prevent axial movement thereof while the sleeve is being forced into the conical bore of the ring by means of nut 29. When the nut 29 has been tightened sufficiently so that the ring 12 is clamped lightly to the shaft, the mechanic notes the position of the right hand end of ring 12 with respect to a line on the scale 28 and then proceeds to tighten nut 29 until the sleeve has been moved a predetermined number of scale lines, for example, one scale line. The bearing is then clamped with the desired force.

The device shown in Fig. 4 is similar to that illustrated in Fig. 3 with the exception that a scale 30 is formed on shaft 25 adjacent to the smaller end of conical sleeve 27. When tightening the bearing to the shaft, the movement of sleeve 27 with respect to the shaft may be measured by the scale 30 and thus a proper degree of tightening may be obtained. The threads 31 formed on the cylindrical portion of the larger end of sleeve 27 are for the purpose of removing the sleeve from within the ring 12, should it be jammed when it is desired to remove the bearing from the shaft. A nut or the like may be screwed on to threads 31 so as to bear against the right hand end of ring 12 and thus force it from the conical sleeve 27.

While I have described several embodiments of my invention, it is to be understood that this has been done for purposes of illustration only and that I am not to be limited except by the appended claims viewed in the light of the prior art.

What I claim is:

1. The combination with a shaft, of a bearing of the kind in which the bearings members are not always in contact with the relatively moving parts comprising a bearing ring having a conical bore, a clamping sleeve having a conical outer surface arranged around said shaft within said conical bore, means for forcing said sleeve into said conical bore, and a scale comprising markings for measuring the distance said sleeve is forced into said bore, said markings being spaced apart the distance said sleeve should be forced into said bore after the sleeve has been inserted into the bore only far enough to prevent relative turning between said shaft, said sleeve and said bearing ring without the exertion of an appreciable force.

2. The combination with a shaft, of a bearing of the kind in which the bearing members are not always in contact with the relatively moving parts comprising a bearing ring having a conical bore, a clamping sleeve having a conical outer surface arranged around said shaft within said conical bore, means for forcing said sleeve into said conical bore, and a scale comprising markings for measuring the distance said sleeve is forced into said bore, said markings being spaced apart the distance said sleeve should be forced into said bore to effect tight clamping together of said shaft, said sleeve and said bearing ring without unduly expanding said bearing ring.

3. The combination with a shaft, of an inner bearing ring having a conical bore, an outer race ring, load-transmitting elements carried by said bearing ring and adapted to slide relative to said race ring, a clamping sleeve having a conical outer surface arranged around said shaft within said conical bore, means for forcing said sleeve into said conical bore, and a scale comprising markings for measuring the distance said sleeve is forced into said bore, said markings being spaced apart the distance said sleeve is to be forced into said bore to effect tight clamping together of said shaft, said sleeve and said bearing ring without expanding said bearing ring sufficiently to interfere with the sliding of said elements with respect to said race ring.

4. The combination with a shaft, of an inner bearing ring having a conical bore, an outer race ring, load-transmitting elements carried by said bearing ring and adapted to slide relative to said race ring with clearance therebetween, a clamping sleeve having a conical outer surface arranged around said shaft within said conical bore, means for forcing said sleeve into said conical bore, and a scale comprising makings for measuring the distance said sleeve is forced into said bore, said markings being spaced apart the distance said sleeve is to be forced into said bore to effect tight clamping together of said shaft, said sleeve and said bearing ring without expanding said bearing ring sufficiently to appreciably alter the clearance between said elements and said outer race ring.

5. In a bearing, an inner ring, an outer ring, bearing blocks between said rings incapable of transmitting force between said rings due to expanding of the inner ring when the bearing is stationary and tiltable on rotation to provide force transmitting film spaces, wedging means movable relative to said inner ring between said inner ring and a shaft and acting on relative movement to expand said inner ring and stress the same, and means to predetermine the amount of stress applied to said inner ring due to movement of said wedging means.

6. In a bearing, an inner ring, an outer ring, bearing blocks between said rings incapable of transmitting force between said rings due to expanding of the inner ring when the bearing is stationary and tiltable on rotation to provide force transmitting film spaces, wedging means movable relative to said inner ring between said inner ring and a shaft and acting on relative movement to expand said inner ring and stress the same, and means to predetermine the amount of stress applied to said inner ring due to movement of said wedging means comprising markings on said wedging means.

7. In a bearing, an inner ring, an outer ring, tiltable bearing blocks between said rings, said blocks being loose when the bearing is stationary, a wedging sleeve movable relative to said inner ring for imposing stress on said inner ring and operative to vary the relation of the blocks to the outer ring, and markings for measuring the relative movement of the inner ring and the sleeve in terms of stress to control the relation of the blocks to the outer ring.

8. In a bearing, a first ring, a second ring, tiltable bearing blocks between said rings, said blocks being loose when the bearing is stationary, securing means movable relative to said first ring and operative to vary the relation of the blocks to the second ring, and means for measuring the relative movement of the securing means and the first ring to control the relation of the blocks to the second ring.

9. In a bearing, an inner ring, an outer ring, load transmitting elements between said rings, adapted on rotation to be separated from at least one of said rings by a force transmitting film of lubricant, wedging means movable relative to said inner ring between said inner ring and a shaft and acting on relative movement to expand said inner ring and stress the same, and means to predetermine the amount of stress applied to said inner ring due to movement of said wedging means.

10. In a bearing, a first ring, a second ring, load transmitting elements between said rings, there being initial looseness between said elements and said rings when the bearing is stationary, securing means movable relative to said first ring for imposing stress on said first ring and operative to vary said initial looseness, and means for measuring the relative movement of the securing means and the first ring in terms of stress to control said initial looseness.

11. In a bearing including inner and outer integral bearing rings, a plurality of load transmitting bearing elements mounted on the inner bearing ring and movably cooperating with the outer bearing ring, means for mounting said inner bearing ring on a shaft including clamp means within the said inner bearing ring and cooperating with the ring and shaft for securing the bearing ring thereto, and means for predetermining the clamping effect of the clamping means between the shaft and bearing ring and preventing distortion of the inner bearing ring which will cause the bearing elements to bind with the outer bearing ring.

12. In a bearing including an outer bearing ring, an integral inner annular bearing ring, movable load transmitting bearing elements between said rings having restricted movement with respect to and rotatable with the inner ring and having a bearing engagement with the outer ring with an increased contact pressure when in rotation, means for securing the inner ring to a shaft with which it rotates including a clamp cooperating with the shaft and the interior of the ring for fastening it in place, and means for indicating the clamping effect of the clamp to prevent distortion of the inner bearing ring with which it cooperates which through undue expansion would reduce the necessary play or clearance and cause the bearing elements to bind when rotating.

AUGUST GUNNAR FERDINAND WALLGREN.